US010873261B2

(12) United States Patent
You et al.

(10) Patent No.: US 10,873,261 B2
(45) Date of Patent: Dec. 22, 2020

(54) PEAK CURRENT ESTIMATION BASED ON OUTPUT CAPACITOR PARAMETERS AND CHANGE OF OUTPUT VOLTAGE

(71) Applicant: Infineon Technologies Austria AG, Villach (AT)

(72) Inventors: Zhiqing You, Torrance, CA (US); Tim Ng, Monterey Park, CA (US)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/407,768

(22) Filed: May 9, 2019

(65) Prior Publication Data

US 2020/0358354 A1  Nov. 12, 2020

(51) Int. Cl.
*H02M 3/158* (2006.01)
*H02M 1/00* (2006.01)
*H02M 1/32* (2007.01)
*H02M 1/08* (2006.01)

(52) U.S. Cl.
CPC ............ *H02M 3/158* (2013.01); *H02M 1/08* (2013.01); *H02M 1/32* (2013.01); *H02M 2001/0009* (2013.01)

(58) Field of Classification Search
CPC . H02M 3/158; H02M 2001/0009; H02M 1/32
See application file for complete search history.

(56) References Cited

U.S. PATENT DOCUMENTS

| | | | | |
|---|---|---|---|---|
| 6,064,187 A * | 5/2000 | Redl | ...................... | G05F 1/565 323/224 |
| 6,329,801 B1 * | 12/2001 | Zuniga | ................ | H02M 3/1563 323/282 |
| 8,138,732 B2 * | 3/2012 | Tseng | .................... | H02M 3/156 323/282 |
| 8,698,467 B2 * | 4/2014 | Oki | ........................ | H02M 3/156 323/282 |
| 9,531,265 B1 * | 12/2016 | Voigtlander | .......... | H02M 3/158 |
| 9,960,675 B2 * | 5/2018 | Almukhtar | ............ | H02M 3/156 |
| 10,211,729 B2 * | 2/2019 | Duong | .................... | H02M 1/08 |
| 2004/0032242 A1 * | 2/2004 | Corva | ................... | H02M 3/156 323/284 |
| 2008/0258701 A1 * | 10/2008 | Liu | ..................... | H02M 3/1588 323/328 |

(Continued)

*Primary Examiner* — Thienvu V Tran
*Assistant Examiner* — Sisay G Tiku
(74) *Attorney, Agent, or Firm* — Murphy, Bilak & Homiller, PLLC

(57) ABSTRACT

A controller of a switching voltage regulator estimates a load current based upon a current within the voltage regulator, a change in the output voltage of the voltage regulator, and the capacitance and/or equivalent series resistance (ESR) of an output capacitor. For sharp drops in the output voltage, the output capacitor's ESR provides a better estimate of the load current, whereas the output capacitance provides a better estimate for moderate output voltage drops. These techniques allow the voltage regulator controller to more quickly detect excessive load current, and issue an over current warning to the load with little latency. The fast response afforded by these techniques provides the load, e.g., a CPU or GPU, sufficient time to reduce its current, thereby avoiding a complete shutdown due to excessive load current.

12 Claims, 9 Drawing Sheets

(56) References Cited

U.S. PATENT DOCUMENTS

| | | | | |
|---|---|---|---|---|
| 2009/0079409 | A1* | 3/2009 | Chang | H02M 3/157 |
| | | | | 323/284 |
| 2009/0322300 | A1* | 12/2009 | Melanson | H02M 3/1563 |
| | | | | 323/284 |
| 2011/0050187 | A1* | 3/2011 | Lai | H02M 3/1588 |
| | | | | 323/282 |
| 2011/0204859 | A1* | 8/2011 | Prodic | H02M 3/1588 |
| | | | | 323/271 |
| 2012/0098553 | A1* | 4/2012 | Karlsson | H02M 3/157 |
| | | | | 324/684 |
| 2016/0268899 | A1* | 9/2016 | Rader | H02M 3/156 |

* cited by examiner

PEAK CURRENT ESTIMATION BASED ON OUTPUT CAPACITOR PARAMETERS AND CHANGE OF OUTPUT VOLTAGE

TECHNICAL FIELD

The present application relates to techniques for estimating a peak current provided to a load of a voltage regulator based upon a current in the voltage regulator, a change in the output voltage provided to the load, and a capacitance or equivalent series resistance (ESR) of an output capacitor.

BACKGROUND

Many power supply loads, including servers, gaming consoles, and high-end computing processors, require that an over current (OC) warning signal be received as soon as possible when a load transient causes the load current to spike to excessive levels. Once such a load receives an OC warning signal, the load can reduce the load current, e.g., by turning off portions of a central or graphics processing unit (CPU or GPU) within the load, or by otherwise clamping the drawn current to a safe level that will prevent the load from shutting down due to excessive current. The voltage regulator providing power to a load must typically provide such an OC warning signal, and must issue this signal with minimal delay since there is a further latency for the load to adjust the load current in response to the OC warning signal. For example, the system within typical loads may require that such an OC warning be issued within 4 µsec of a current peak. If the OC warning signal is issued soon enough, e.g., within this 4 µsec time limit, the load current (e.g., the CPU/GPU current) may be reduced in time to prevent a shutdown due to excessive current.

The delay from when an output load current reaches a warning level until the OC warning is issued may not provide adequate time to prevent an overcurrent shutdown by the load. The primary component of this delay is the latency between when the output load current increases and when this increase is detected within the voltage regulator. Most switching voltage regulators use an energy-storage inductor to regulate the voltage, and the inductor constrains the rate of change of the current output from the voltage regulator. Increases (and decreases) in the load current lead to corresponding increases (and decreases) in the inductor current, but only after some lag. This lag is largely dependent upon the inductance of the inductor, wherein larger inductances lead to longer delays.

One technique for reducing the reporting latency, and thereby improving the OC warning performance, is to use a smaller inductance. However, a smaller inductance typically requires a higher switching frequency in a switching voltage regulator, which comes at the expense of higher switching losses and lower power efficiency. Given the importance of power efficiency for a voltage regulator, it is typically preferable to use a larger inductor so as to optimize the power efficiency.

Techniques are needed for reducing the latency in detecting, at a voltage regulator, an excessive current level at the load, such that an OC warning signal may be promptly issued to the load. Such techniques should not reduce the power efficiency of the voltage regulator and, thus, should not affect the chosen inductor size.

SUMMARY

According to an embodiment of a method for estimating a load current provided to a load of a switching voltage regulator, the method may be implemented within the switching voltage regulator. The method comprises sensing an inductor current and an output voltage of the switching voltage regulator. The method further includes determining a voltage change in the sensed output voltage, and estimating a peak current of the load current based upon the inductor current, the voltage change, and a capacitor parameter of an output capacitor of the switching voltage regulator. The capacitor parameter may be, e.g., a capacitance or equivalent series resistance (ESR) of the output capacitor.

According to an embodiment of a switching voltage regulator, the switching voltage regulator is configured to estimate a load current provided to a load. The switching voltage regulator comprises a power stage, an output, an output capacitor, an inductor, and a controller. The output is for coupling to the load and for providing current to the load. The output capacitor is coupled to the output and has capacitor parameters comprising an output capacitance and an output capacitor ESR. The inductor is coupled between the power stage and the output, and has an inductor current flowing through it. The controller is configured to sense the inductor current and an output voltage at the output. The controller is further configured to determine a voltage change in the sensed output voltage, and to estimate a peak current of the load current based upon the sensed inductor current, the voltage change, and at least one of the capacitor parameters.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description that follows.

DETAILED DESCRIPTION

Figure 1:
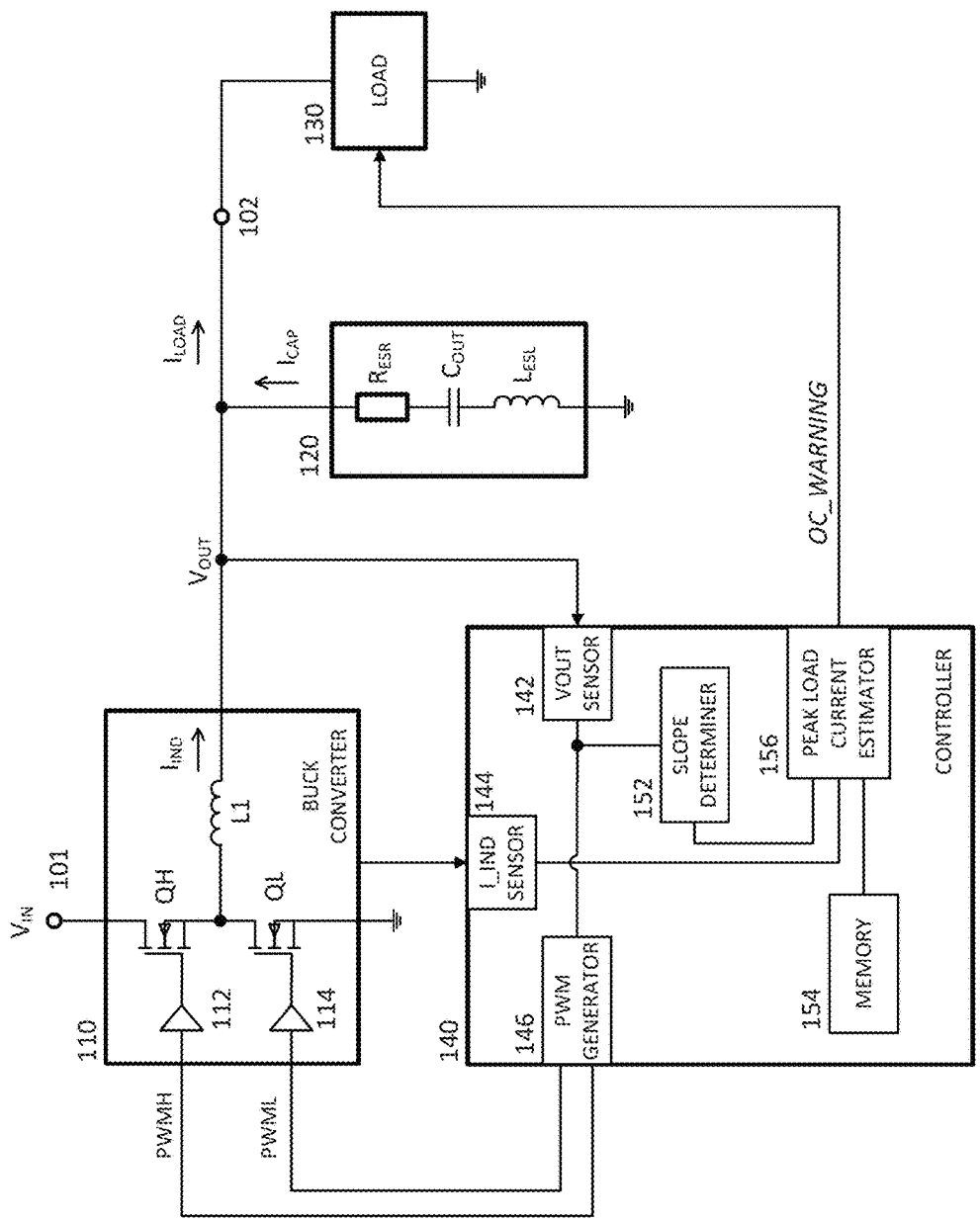
FIG. 1 illustrates a schematic diagram of a switching voltage regulator that includes a controller configured to estimate a peak load current and to issue an over current warning signal based, in part, on a sensed output voltage.

The embodiments described herein provide circuits and methods for estimating a peak current that is being sunk by a load. The described techniques are implemented within a voltage regulator, or a controller therein, that is supplying power to the load. Rather than relying only on a measured current within the voltage regulator, e.g., the current through an inductor of a switching power supply, the techniques also use a measured output voltage of the voltage regulator, in conjunction with parameters of the output capacitor, to estimate the peak load current. Because the output voltage changes almost immediately after a sharp load current increase, the described estimation techniques based upon the output voltage are able to track the peak load current with significantly less latency than estimation techniques that rely only on the measured output current of the voltage regulator. The estimated peak load current may be used to generate an over current (OC) warning signal, which is sent to the load. The reduced latency afforded by the described peak load current estimation techniques leads to reduced delay in issuing an OC warning signal after a load current transient, thereby improving the likelihood that the load will be able to safely reduce its current draw and avoid an OC shutdown.

For clarity of description, the techniques are explained in the context of particular examples based upon a voltage regulator that is a switching buck converter. However, the techniques may be similarly applied to other non-isolated voltage regulators that use an energy-storage inductor in conjunction with a power (switch) stage including, e.g., boost converters and buck/boost converters. The techniques may similarly be implemented within isolated voltage converters including, e.g., flyback and forward converters. The described peak load current estimation techniques may improve the latency for issuing an OC warning from any voltage regulator that incurs a significant delay between when a load current transient occurs and when an associated peak load current may be detected in a sensed current within the voltage regulator. The techniques rely upon measuring the output voltage of the voltage regulator, and using parameters of an output capacitor coupled to the output voltage. These parameters include the equivalent series resistance (ESR) and/or the capacitance of the output capacitor, and are typically stored in a memory within the voltage regulator.

The described embodiments provide particular examples for purposes of explanation, and are not meant to be limiting. Features and aspects from the example embodiments may be combined or re-arranged, except where the context does not allow this. The following begins with a description of circuitry corresponding to a load and a voltage regulator that supplies power to this load. The techniques are further described in conjunction with waveforms that show currents and voltages associated with the voltage regulator and the load. Next, accuracy results for the peak load estimation techniques are provided for a variety of conditions. Finally, example methods for estimating peak load current are described.

Voltage Regulator for Estimating Peak Load Current

FIG. 1 illustrates a schematic diagram 100 for a load 130 and a voltage regulator supplying power to the load. The load may include a central processing unit (CPU), graphics processing unit (GPU), server, gaming console processor, etc. The voltage regulator is supplied an input voltage $V_{IN}$ at an input terminal 101, and supplies an output voltage $V_{OUT}$ at an output terminal 102, which is coupled to the load 130. The voltage regulator includes a buck converter 110 and a controller 140. An output capacitor 120 is coupled to the output voltage $V_{OUT}$ of the voltage regulator, and serves to filter (smooth) the voltage $V_{OUT}$ provided to the load 130. The output capacitor 120 is modelled as an equivalent series resistor (ESR) having a resistance $R_{ESR}$, an equivalent series inductance (ESL) have an inductance $L_{ESL}$, and an ideal capacitor having a capacitance $C_{OUT}$.

The buck converter 110 includes a power stage coupled between the input terminal 101 and a ground reference. The power stage has a high-side switch QH, which is driven by a high-side driver 112, and a low-side switch QL, which is driven by a low-side driver 114. An inductor L1 couples the node between the high and low-side switches QH, QL to the output terminal 102. Control signals PWMH, PWML are input to the buck converter 110, and control the output voltage $V_{OUT}$ and the regulator current $I_{IND}$. The buck converter 110 may be operated in continuous conduction mode (CCM), in which the high and low-side control signals PWMH, PWML alternate being active, such that the high-side switch QH is turned on and the low-side switch QL is turned off to charge the inductor L1 for a first interval, followed by a second interval during which the high-side switch QH is turned off and the low-side switch QL is turned on to discharge the inductor L1. (The first and second intervals are separated by a brief 'dead time' during which neither switch QH, QL conducts, so as to avoid current shoot-through.) Alternatively, the buck converter 110 may be operated in a discontinuous conduction mode (DCM), during which both switches QH, QL may be turned off for significant intervals of time and the node between the switches QH, QL may be left floating. The techniques described herein may be used with either CCM or DCM.

The power switches QH, QL illustrated in FIG. 1 are enhancement-mode metal-oxide semiconductor field-effect transistors (MOSFETs), but other switch types may be used. For example, junction field-effect transistors (JFETs), bipolar junction transistors (BJTs), insulated gate bipolar transistors (IGBTs), high electron mobility transistors (HEMTs), or other types of power transistors may be preferred in some applications.

The controller 140 generates the switch control signals PWMH, PWML so as to regulate the output voltage $V_{OUT}$, and estimates a peak load current, which may be used to generate an OC warning signal OC_WARNING when the estimated peak load current exceeds an OC warning threshold. The OC_WARNING signal is provided to the load 130, so that the load 130 may take corrective action such as disabling circuitry or otherwise reducing its current draw.

The controller 140 includes an output voltage sensor 142 and a pulse-width-modulation (PWM) signal generator 146. The PWM generator 146 typically includes a closed-loop controller, such as a proportional-integral-differential (PID) controller, for maintaining the output voltage $V_{OUT}$ near a desired target voltage. For example, the switch control signals PWMH, PWML may be generated using a fixed frequency, in which case the closed-loop controller may generate a duty cycle for the switch control signals PWMH, PWML. If the output voltage $V_{OUT}$ drops below its target, the duty cycle of the high-side control signal PWMH is increased, so as to supply additional current to the output terminal 102. Conversely, if the output voltage $V_{OUT}$ rises above its target, the duty cycle of the high-side control signal PWMH is reduced, so as to supply less current to the output terminal 102. Alternately, the PWM generator 146 may generate fixed-width PWM switch control signals PWMH, PWML, and vary their frequency so as to regulate the output voltage $V_{OUT}$. For converter topologies other than the buck converter 110, e.g., topologies relying upon a full-bridge switch circuit, a phase shift may be used to control the output voltage $V_{OUT}$. Because control of switching converters, such as the buck converter 110, is known in the art, further detail is not provided.

The controller 140 also includes a current sensor 144 which, as illustrated, is provided with a current measurement from the buck converter 110. In a first example, a shunt resistor (not shown for ease of illustration) may be serially coupled to the inductor L1, and a voltage across the shunt resistor may be measured and used to estimate the regulator current $I_{IND}$. In a second example, a direct current resistance (DCR) circuit (also not shown for ease of illustration) may be coupled to the inductor L1 and used to estimate the regulator current $I_{IND}$. In a third example, current mirrors (not shown for ease of illustration) may be coupled in parallel with the switches QH, QL and used to measure the switch current, which may be readily mapped to the regulator current $I_{IND}$. In yet another example, drain-to-source voltages across the switches QH, QL may be measured and used, in conjunction with an on-resistance of the switches QH, QL, to estimate currents through the switches, which may then be readily mapped to the regulator current $I_{IND}$. Other techniques for estimating the regulator current $I_{IND}$ may be used, and the peak current estimation techniques described herein are not limited to the above representative examples for estimation of the regulator current $I_{IND}$.

The controller 140 further includes a voltage slope determiner 152, a memory 154, and a peak load current estimator 156. The voltage slope determiner 152 provides a voltage slope $\Delta V_{OUT}/\Delta t$ and/or a voltage change $\Delta V_{OUT}$. The memory 154 stores parameters related to the output capacitor 120, including the resistance $R_{ESR}$ and the output capacitance $C_{OUT}$, and other parameters, such as slope thresholds, related to the peak load current estimation techniques. The output capacitor parameters are typically characterized during an initial calibration of the circuit 100, or are based on rated or measured values for the output capacitor 120, and are stored prior to use of the circuit 100. Alternatively or additionally, these parameters may be adaptively updated during by the controller 140 during normal use of the circuit 100 or during occasional calibration intervals. The peak load current estimator 156 estimates the peak load current based upon the measured current corresponding to the regulator current $I_{IND}$, the voltage slope $\Delta V_{OUT}/\Delta t$ and/or voltage change $\Delta V_{OUT}$, and output capacitor parameters retrieved from the memory 154. The voltage slope determiner 152 and peak load current estimator 156 will be described in further detail in conjunction with the waveforms of FIG. 3A.

The controller 140 and its constituent parts may be implemented using a combination of analog hardware components (such as transistors, amplifiers, diodes, and resistors), and processor circuitry that includes primarily digital components. The processor circuitry may include one or more of a digital signal processor (DSP), a general-purpose processor, and an application-specific integrated circuit (ASIC). The memory 154 may include non-volatile memory such as flash, in which instructions or data, in addition to the capacitor parameters described previously, may be stored for use by the processor circuitry.

Figure 2:
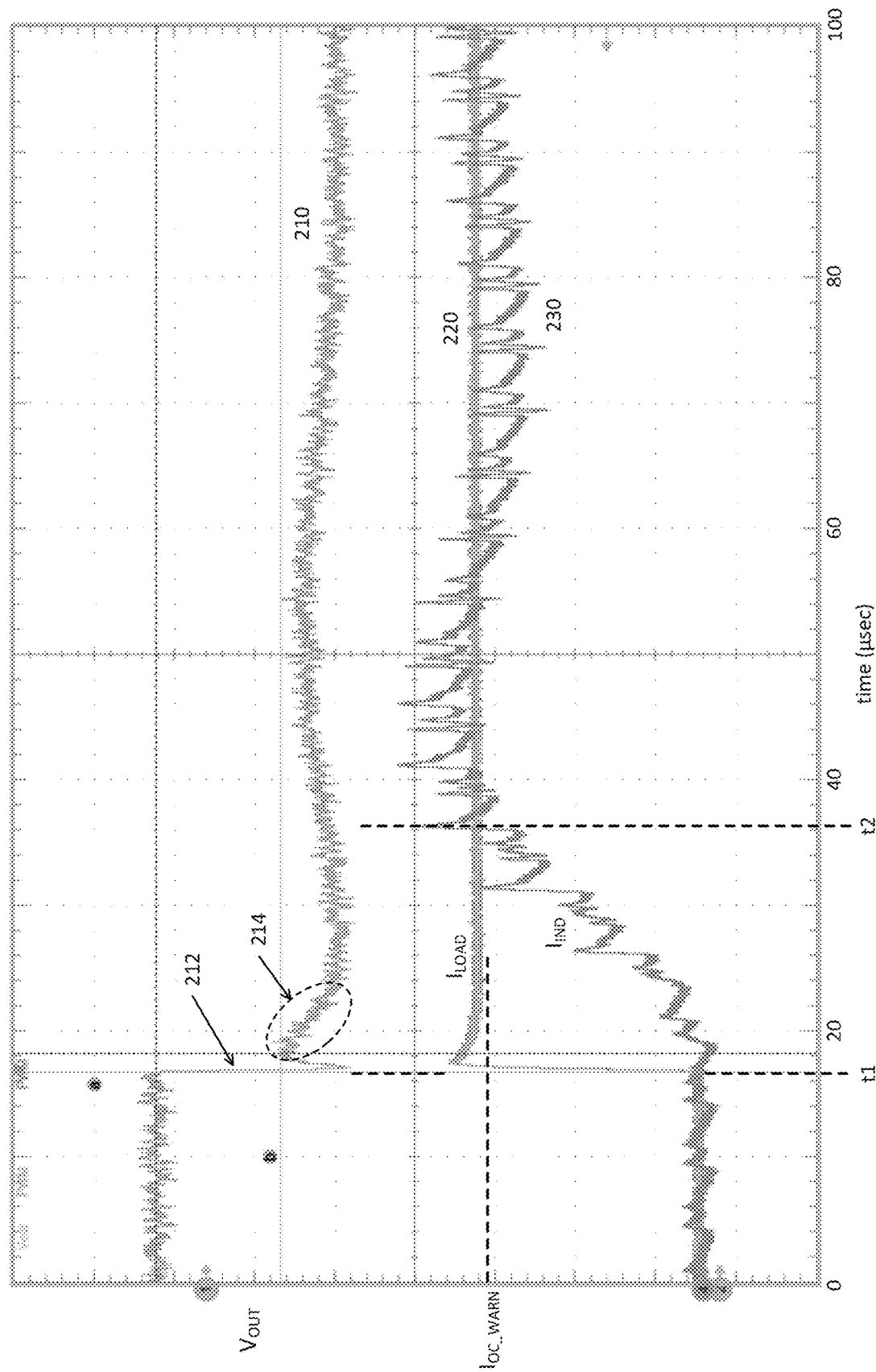
FIG. 2 illustrates waveforms corresponding to voltage and currents within a circuit similar to that of FIG. 1.

FIG. 2 illustrates waveforms corresponding to voltages and currents within a circuit such as the circuit 100 of FIG. 1. A first waveform 210 shows the output voltage $V_{OUT}$, a second waveform 220 shows the load current $I_{LOAD}$, and a third waveform 230 shows the current $I_{IND}$ that is output from the buck converter 110. At time t1, a load transient occurs and the load 130 begins drawing significantly more current. For example, a CPU (load) may transition from a sleep state to a high-activity state. The load current $I_{LOAD}$ spikes from a current near zero to a dangerously high current at time t1. In conjunction with this current spike, the output voltage $V_{OUT}$ droops 212 at time t1. After the initial sharp voltage droop 212, the output voltage $V_{OUT}$ partially bounces back and then decreases 214 at a more moderate rate. Subsequent to this decrease 214, the closed-loop control within the controller 140 is able to more effectively manage the voltage $V_{OUT}$ and the voltage changes are more restrained.

Beginning at time t1, the controller 140 increases the current $I_{IND}$ output by the buck converter 110, so as to drive the output voltage $V_{OUT}$ towards its target (reference) value. The switching frequency of the switch control signals PWMH, PWML and the loop bandwidth of the closed-loop control within the controller 140 limit the rate at which this current $I_{IND}$ increases, as shown between times t1 and t2.

An OC warning signal should be generated by the controller 140 responsive to the load current $I_{LOAD}$ rising above an OC threshold $I_{OC\_WARN}$. If the controller 140 relied only upon the measured current $I_{IND}$ from the buck converter 110 to estimate the load current $I_{LOAD}$, the OC warning signal would not be issued until time t2. This represents a delay of nearly 20 μsec between when the load current $I_{LOAD}$ reaches a dangerously high level and the issuance of the OC warning signal. Such a delay may be unacceptably long in some applications, and cause the load 130 to perform a complete OC shutdown. Issuing the OC warning sooner may allow the load to decrease its current in a controlled manner, thereby preventing a complete OC shutdown in many cases.

While the buck converter output current $I_{IND}$ reacts relatively slowly to the current transient at time t1, the output voltage $V_{OUT}$ reacts nearly immediately, as exhibited in the voltage droop 212 and the voltage decrease 214. The controller 140 may use one or both of these changes in the output voltage $V_{OUT}$ to more quickly react to a current transient when estimating the peak load current and, if the estimated peak is high enough, to issue an OC warning. This is explained further in conjunction with the waveforms of FIGS. 3A and 3B.

FIG. 3 illustrates waveforms 310, 320, 330 corresponding to voltages and currents within the circuit 100 of FIG. 1, which are similar to the waveforms of FIG. 2 except that the time scale is expanded and the waveforms 310, 320, 330 are smoother (less noisy) than the waveforms of FIG. 2. In a preferred embodiment, the voltage sensor 142 includes a low-pass filter so as to provide a smoothed output voltage $V_{OUT}$, as illustrated. (Rather than representing the actual output voltage, the waveform 310 represents a sensed version of the output voltage $V_{OUT}$, as output by the voltage sensor 142.) Note, however than any low-pass filtering of the output voltage $V_{OUT}$ must preserve the ESR voltage droop 312 and the voltage decrease 314, such that these voltage changes can be detected and used for peak load current estimation. Furthermore, the current sensor 144 may similarly include a low-pass filter to provide a smoothed version of the sensed current output from the buck converter 110. Any low-pass filtering of the sensed output voltage $V_{OUT}$ or the sensed regulator current $I_{IND}$ should not add significant delay to the sensed values. Because low-pass filters are known in the art, they will not be described in further detail herein.

The mechanism by which the sharp voltage droop 312 at time t1 occurs may be primarily attributed to the modelled ESR of the output capacitor 120. In particular, the current transient at time t1 causes a surge of current $I_{CAP\_t1}$ to be drawn from the output capacitor 120, as the buck converter 110 cannot yet supply the current $I_{LOAD}$ being sunk by the load 130. (Current from the output capacitor 120 is shown in FIG. 1 as $I_{CAP}$.) This current surge $I_{CAP\_t1}$ creates a voltage drop $\Delta V_{ESR}$ across the modelled ESR resistance $R_{ESR}$, and may be estimated as $\Delta V_{ESR}/R_{ESR}$. The peak load current may thus be estimated using:

$$I_{PEAK} = I_{IND} + \frac{\Delta V_{ESR}}{R_{ESR}}. \quad (1)$$

In a first embodiment, the peak load current estimator 156 implements such estimation based upon a sensed regulator current $I_{IND}$ provided by the current sensor 144, $R_{ESR}$ provided by the memory 154, and the voltage change $\Delta V_{ESR}$ provided by the slope determiner 152. (This voltage change $\Delta V_{ESR}$ is considered to always be positive, i.e., $\Delta V_{ESR} = |V_{OUT}(t1b) - V_{OUT}(t1a)|$.) If the resultant estimated load current peak $I_{PEAK}$ exceeds an OC warning $I_{OC\_WARN}$, the controller 140 may issue an OC warning signal (OC_WARNING). The load 130 may then take corrective action, which typically includes reducing its current draw such that the load current LOAD would decrease. (The waveforms of FIG. 3A do not show such a decrease, as these waveforms are provided for the purpose of showing how the peak load current $I_{PEAK}$ is estimated, rather than to show results of the load's corrective action.)

Equation (1) provides a good estimation $I_{PEAK}$ of the peak load current when the ESR of the output capacitor 120 is primarily responsible for a voltage drop, such as the illustrated voltage droop 312 occurring between times t1a and t1b. The slope determiner 152 and the peak load estimator 156 monitor the output voltage $V_{OUT}$ searching for such a voltage droop 312. In particular, the controller 140 searches for a negative change in the output voltage $V_{OUT}$ that has a magnitude that is higher than a pre-defined ESR slew rate for the output voltage. (Such a pre-defined slew rate, termed ESR_THR below, may be stored in the memory 154.) If such an occurrence is detected, the voltage change $\Delta V_{ESR}$ is captured and used in the estimation described above. In a sub-embodiment, the voltage sensor 142 may include an analog-to-digital converter (ADC) that periodically samples the output voltage $V_{OUT}$ and provides such digitized voltage samples to the slope determiner 152. Within a sliding window of samples, e.g., the most recent N samples, the slope determiner 152 may capture a maximum voltage $V_{MAX}$ and a minimum voltage $V_{MIN}$, and determine the voltage drop $\Delta V_{ESR} = V_{MAX} - V_{MIN}$ within such a window. For example, a first window size of 0.5 µsec may be desired, which corresponds to N=50 samples at a sample rate of 100 MHz. These parameters are dependent on the sample rate, the characteristics of the output capacitor 120, the loadline, etc., and may need to be customized according to the particular application. Such parameters, including the window size, are preferably stored in the memory 154. The voltage drop $\Delta V_{ESR}$ is monitored to find a local peak in its magnitude, e.g., by preserving a maximum of the voltage drop $\Delta V_{ESR}$ within a second window that is larger than the first window, e.g., the second window may be 2 µsec wide. If a maximum voltage drop $\Delta V_{ESR}$ within such a second window exceeds a threshold $\Delta V_{ESR\_THR}$, the above-described first embodiment, including equation (1), may be advantageously used to estimate the peak load current $I_{PEAK}$.

The above techniques for determining the voltage drop $\Delta V_{ESR}$ are merely examples, and other techniques may be preferred in some applications. For example, the slope determiner 152 may rely upon an analog version of the sensed output voltage $V_{OUT}$ rather than digitized samples as described above. A delay line may be used to provide a current and a past version of the output voltage $V_{OUT}$ to a difference amplifier, which generates a voltage difference $\Delta V_{ESR}$. This voltage difference $\Delta V_{ESR}$ is then compared against the threshold $\Delta V_{ESR\_THR}$ using a comparator and, if the voltage difference $\Delta V_{ESR}$ exceeds the threshold $\Delta V_{ESR\_THR}$, the above-described first embodiment may be used to estimate the peak load current $I_{PEAK}$.

For some cases, the above-described peak current estimation based upon the ESR of an output capacitor 120 may not be triggered or may not provide a sufficiently accurate estimate. For example, an output capacitor having a low ESR may not generate an adequate voltage droop 312 magnitude for estimating the peak load current. For another example, the voltage sensor 142 may not be capable of sensing a sharp voltage droop 312 due, e.g., to limited digitization bandwidth and/or an inadequate sampling rate. For such cases, a second embodiment may be used to estimate the current, wherein the second embodiment relies upon the capacitance $C_{OUT}$ of the output capacitor for estimating the peak output load current $I_{PEAK}$.

During the time interval corresponding to the dV/dt slope 314 in FIG. 3, the output voltage $V_{OUT}$ exhibits a negative voltage slope with a large magnitude. This large-magnitude negative voltage slope is indicative of the amount of load current $I_{LOAD}$ being discharged from the output capacitor 120, i.e., the current $I_{CAP}$ of the circuit 100. (As shown during the time interval corresponding to the illustrated slope 314, the regulator current $I_{IND}$ is just beginning to increase and is inadequate for supplying the increased load current $I_{LOAD}$.) Such discharge current $I_{CAP}$ may be estimated using $C_{OUT}(dV/dt)$, leading to the following equation for estimating the peak load current:

$$I_{PEAK} = I_{IND} + \left| C_{OUT} \frac{dV}{dt} \right|. \quad (2)$$

The voltage slope (dV/dt) may be estimated, e.g., using digital voltage samples over a time window $\Delta t$ during which the voltage changes by $\Delta V$. Note that the magnitude of the slope 314 is significantly smaller than the magnitude of the slope 312 used for peak load current estimation using ESR. However, the magnitude of the slope 314 is larger than a voltage slope that may be attributed to normal (steady-state, no transient) operation of the buck converter 110. The slope of the output voltage $V_{OUT}$ may be constantly monitored using, e.g., linear slope estimation techniques. Such techniques may use digitized voltage samples, as described in the first embodiment, or may use analog circuitry for tracking the slope of the output voltage $V_{OUT}$. Because the target voltage slope magnitude is substantially more moderate than that considered for the voltage droop 312, a larger time window $\Delta t$ is typically used for the second embodiment, e.g., time windows of 1 to 4 µsec may appropriate for determining the slope 314. The magnitude of the voltage slope (dV/dt) is tracked and a maximum of this voltage slope (dV/dt) is stored within a localized window, e.g., a window having a size larger than the time window $\Delta t$ over which the slope is determined. The maximum of the slope magnitude is then captured and stored. Because peak tracking techniques are known in the art, further detail is not provided herein.

Estimation of the peak load current $I_{PEAK}$ via the second embodiment and equation (2) is triggered when the captured slope (dV/dt) is negative and has a magnitude above a predetermined threshold. Stated alternatively, such estimation may be triggered when |dV/dt|>CAP_THR, wherein CAP_THR is a voltage slope magnitude above which equation (2) provides a good estimation of the peak load current $I_{PEAK}$. The threshold CAP_THR may be preloaded into the controller 140 and stored in memory 154. Additionally or alternatively, the threshold CAP_THR may be adaptively updated during calibration periods or during normal operation of the circuit 100. Note that the closed-loop controller within the PWM generator 146 has a particular loop bandwidth set by coefficients of the control, and this bandwidth sets maximum changes in the slope of the output voltage $V_{OUT}$ under normal (closed-loop) operation. Hence, in one sub-embodiment, the threshold CAP_THR may be set to a value that is above an expected maximum rate of change set by the loop bandwidth.

The techniques of the first and second embodiments described above may be used separately or in serial combination, and the specific configuration may be set by a configuration parameter within the memory 154. For example, a particular system may have an output capacitor $C_{OUT}$ in which the ESR technique provides a good estimate of the peak load current $I_{PEAK}$. Hence, the configuration parameter may set the controller 140 to use the first embodiment and equation (1) for the estimate. In another example, a low-ESR output capacitor $C_{OUT}$ may be used, and the equation (1) may not provide an adequate estimation. For this case, the configuration parameter may set the controller 140 to use the second embodiment and equation (2) for the estimate. In yet another example, equations (1) and (2) may each provide reasonably good estimates, and the configuration parameter may set the controller 140 to use both the first and second embodiments. The controller 140 may then use the first embodiment and equation (1) to estimate $I_{PEAK}$ at time t1, and subsequently use the second embodiment and equation (2) to estimate $I_{PEAK}$ later during the time interval corresponding to the slope 314.

In a third embodiment, a peak load current estimation $I_{PEAK}$ may be based upon both the ESR and the capacitance $C_{OUT}$ of the output capacitor 120. An initial estimate may be based upon the ESR, and then updated once the (dV/dt) slope is captured. The peak load current may then be estimated using a weighted average of the techniques described above, e.g., $$I_{PEAK} = I_{IND} + \alpha \frac{\Delta V_{ESR}}{R_{ESR}} + (1-\alpha) C_{OUT} \left| \frac{dV}{dt} \right|. \tag{3}$$

If the ESR (first embodiment) provides a better estimate, then the weighting coefficient $\alpha$ may be set to a value greater than 50%, whereas $\alpha$ may be set to a value less than 50% if the C(dV/dt) technique (second embodiment) provides a better estimation. If the techniques provide similar accuracy, $\alpha$ may be set to 50%.

Figure 3A:
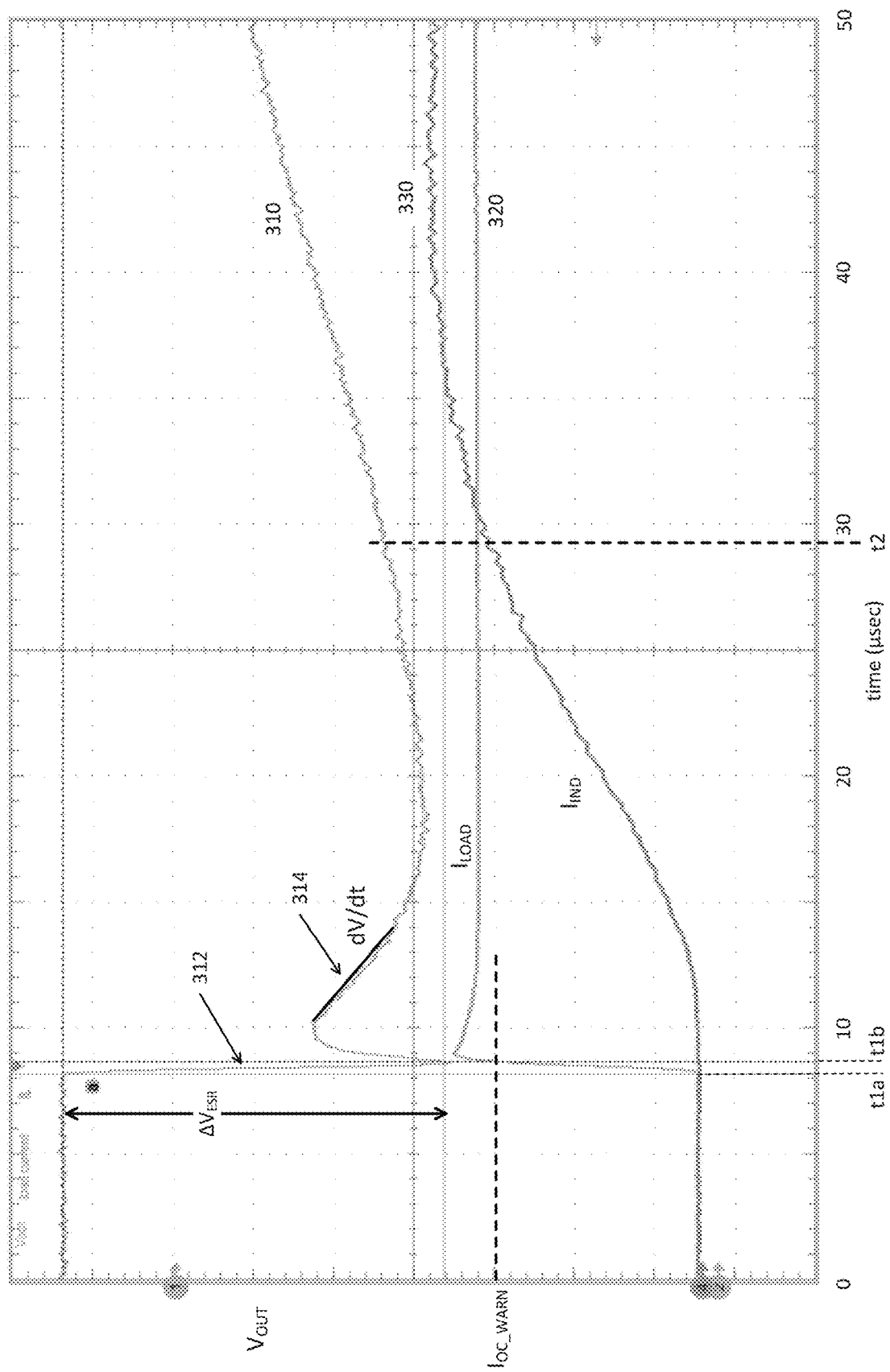
FIGS. 3A and 3B illustrate waveforms corresponding to voltage and currents within FIG. 1.
Figure 3B:
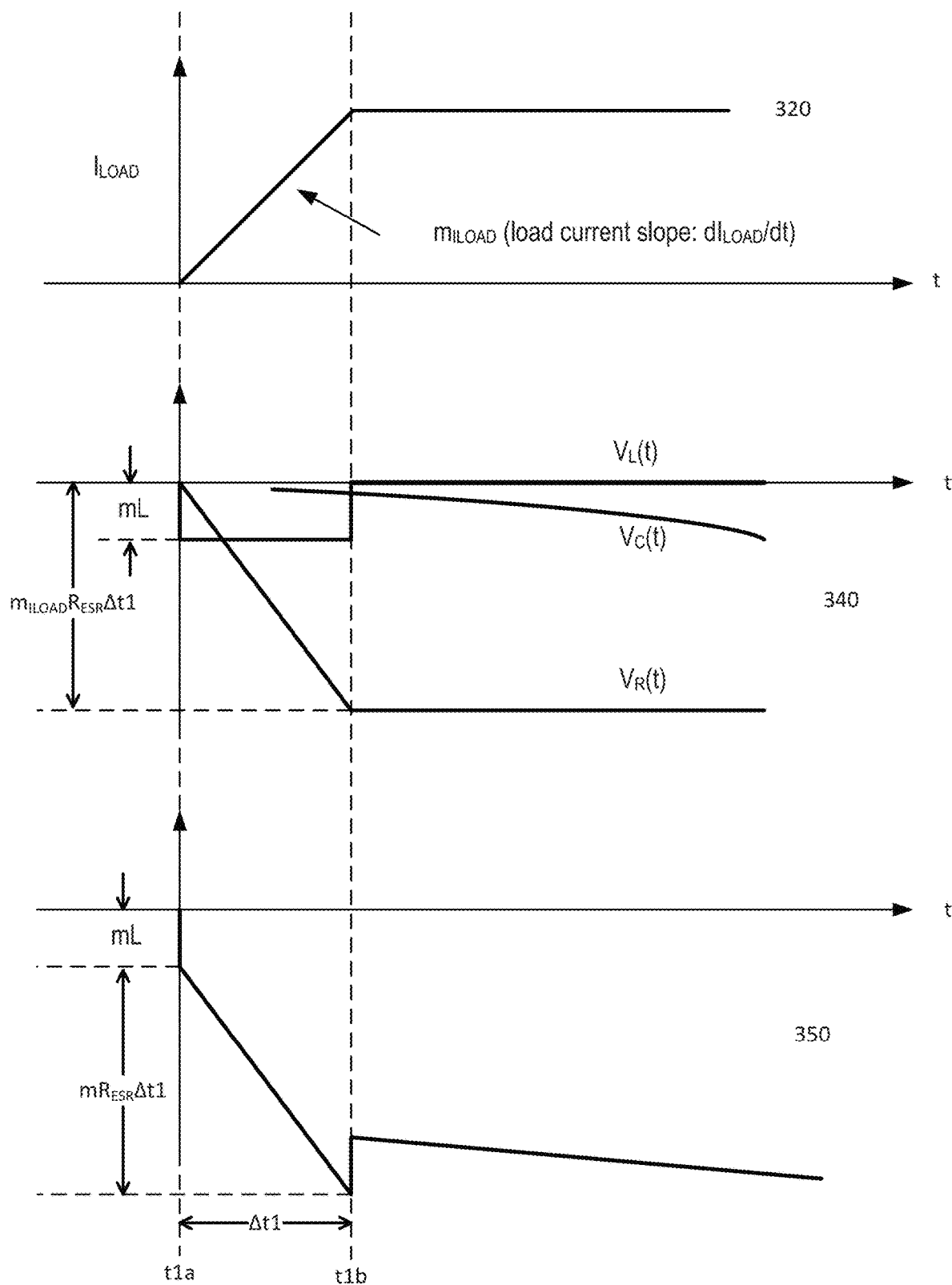

FIG. 3B illustrates component current and voltage waveforms corresponding to the waveforms of FIG. 3A, but focussed on the interval between and immediately after times t1a and t1b. As shown in the waveform 320, the load current $I_{LOAD}$ increases between times t1a and t1b, during which the current has a slope $m_{ILOAD}$. The output voltage $V_{OUT}$ may have a stable steady-state voltage $V_{SS}$ prior to time t1a, and be affected by a transient voltage $V_{trans}$ after the load transient at time t1a. The transient voltage $V_{trans}$ may be partitioned into portions attributable to the ESR of the output capacitor 120, the ESL of the output capacitor 120, and the output capacitance $C_{OUT}$ as follows:

$$V_{OUT} = V_{SS} - V_{TRANS}, \text{ wherein } V_{TRANS} = V_R(t) + V_L + V_C(t). \tag{4}$$

The individual components may be given, after time t=t1a, by:

$$V_R(t) = mR(t - (t-t1b)u(t-t1b)), \tag{5}$$

$$V_L(t) = mL(1 - u(t-t1b)), \tag{6}$$

$$V_C(t) = \frac{m_{ILOAD}}{2C}(t^2 - (t-t1b)^2 u(t-t1b)), \tag{7}$$

wherein u(t) is a unit step function having value 0 before t=t1b and 1 afterwards. Each of the resistive, inductive, and capacitive components $V_R(t)$, $V_L(t)$, $V_C(t)$ are illustrated in the waveforms 340. The resistive component $V_R(t)$, as determined by the ESR of the output capacitor 120, leads to a voltage drop $\Delta V_R = m_{ILOAD} R_{ESR}$ between times t1a and t1b. The inductive component $V_L(t)$ only generates a voltage drop when the current $I_{LOAD}$ is changing, i.e., between times t1a and t1b. As illustrated, the voltage component $\Delta V_L$ attributable to the ESL provides a voltage drop $m_{ILOAD}L$ between times t1a and t1b. The capacitive component $V_C(t)$ increases with the square of the time after t=t1b. The component does not have a significant effect during the illustrated time interval.

The waveform 350 shows the combination of the resistive, inductive, and capacitive components associated with the load transient. Between times t1a and t1b, the resistive component provides the highest contribution to the transient voltage drop $V_{TRANS}$, with a relatively minor contribution from the inductive component. The estimation provided by equation (1) advantageously uses the resistive component between the times t=t1a and t1b. In another subembodiment, this estimation could be further enhanced by additionally basing the peak load current estimation on the ESL. Such a subembodiment may be preferred for applications in which the ESL is relatively large and/or the ESR is relatively low.

The capacitive component $V_C(t)$ does not provide a significant contribution during the interval t=t1a to t1b or immediately thereafter. However, the capacitive component $V_C(t)$ becomes the dominant component later, e.g., in the time interval corresponding to the slope 314 of FIG. 3A. Hence, the estimation provided by equation (2) advantageously uses primarily the capacitive component of the transient voltage drop during this time interval.

Accuracy of the Peak Load Current Estimation Techniques

FIGS. 4A, 4B, 5A, and 5B illustrate waveforms corresponding to different scenarios under which the circuit 100 operates. Under these different scenarios, accuracy results for some of the above-described peak current estimation techniques are presented. The illustrated waveforms are similar to the waveforms of FIG. 3, and the below description focuses on those aspects that differ from FIG. 3.

Figure 4A:
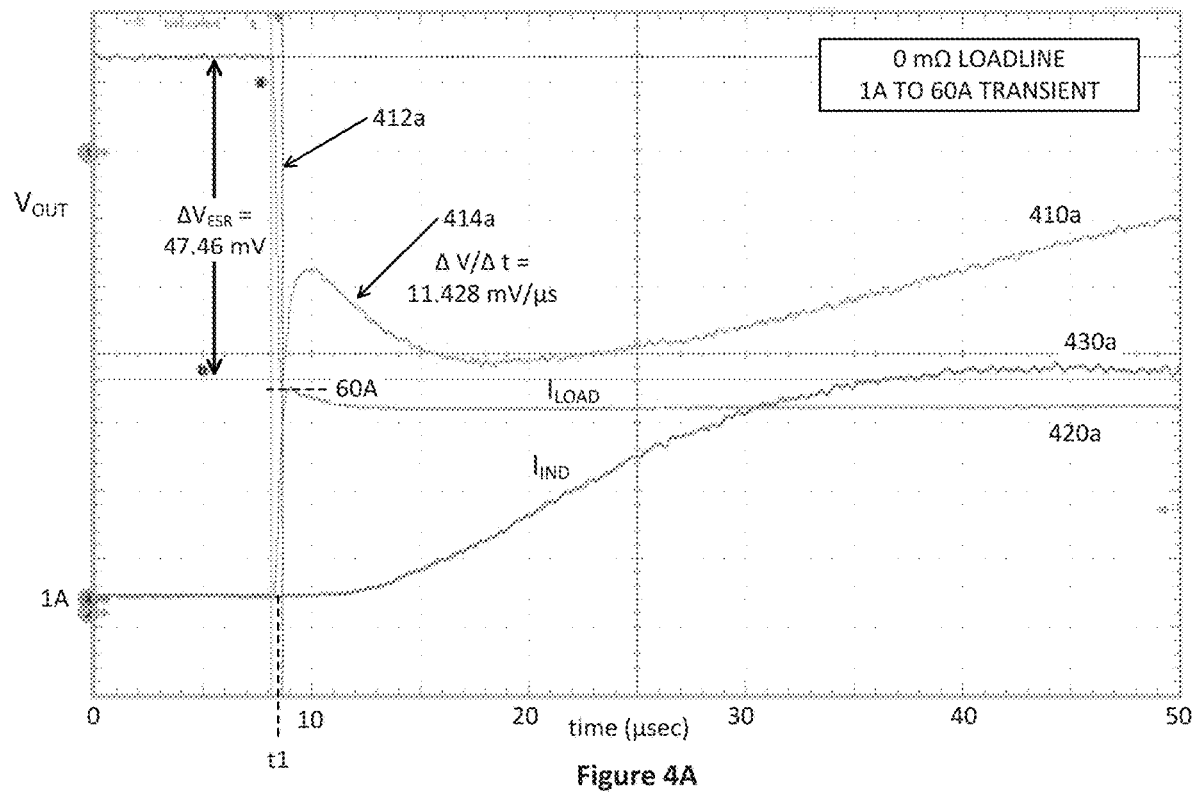
FIGS. 4A, 4B, 5A, 5B illustrate waveforms corresponding to voltage and currents within FIG. 1, under a variety of loadline conditions and with different current transients.

FIG. 4A illustrates waveforms 410a, 420a, 430a corresponding to a scenario in which the circuit 100 has an idealized loadline, i.e., there is 0 resistance between the buck converter 110 and the load 130, and in which the load creates a current transient raising the load current $I_{LOAD}$ from 1 A to 60A at time t1. The first waveform 410a shows the output voltage $V_{OUT}$, the second waveform 420a shows the load current $I_{LOAD}$, and the third waveform 430a shows the current $I_{IND}$ that is output from the buck converter 110. The load current $I_{LOAD}$ spikes from 1 A to 60 A at time t1, thereby causing an ESR-related voltage droop 412a of $\Delta V_{ESR}$=47.46 mV. The output voltage $V_{OUT}$ recovers over the next approximately 1.2 µs, after which the output capacitor discharge leads to a voltage slope 414a having |ΔV/Δt|=11.428 mV/µs, as shown.

Figure 4B:
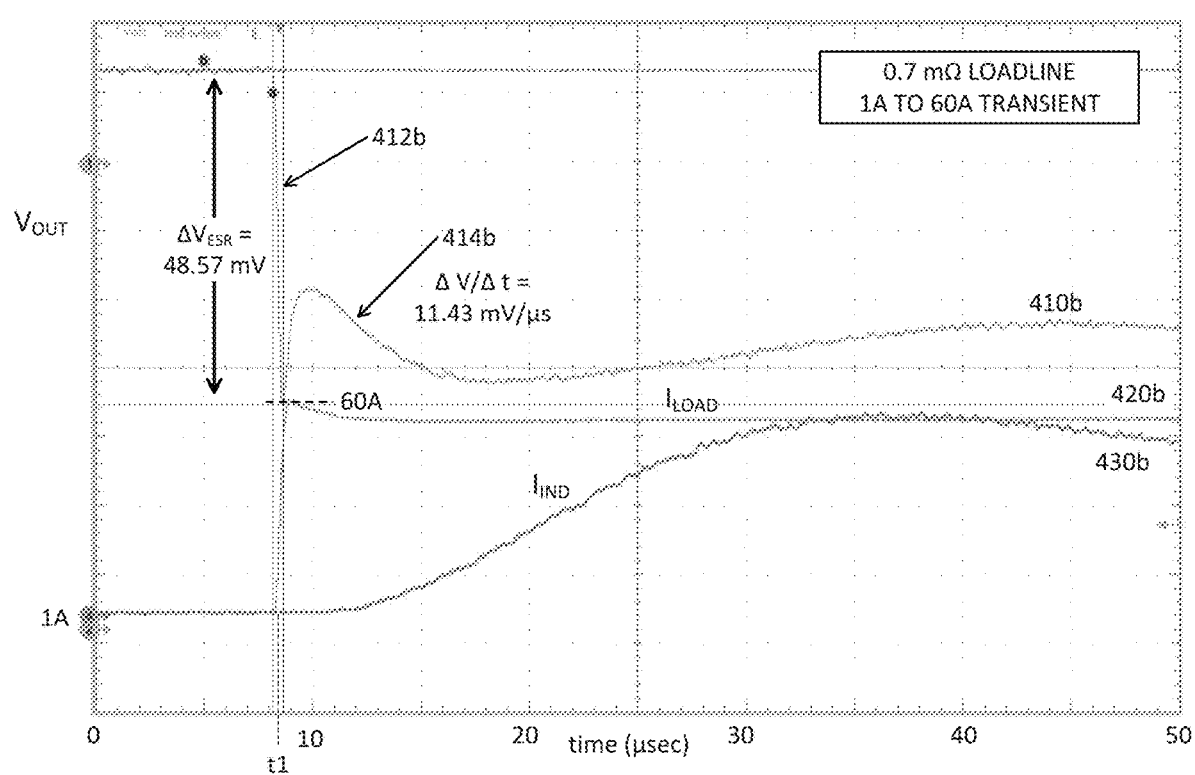

FIG. 4B illustrates waveforms 410b, 420b, 430b similar to those of FIG. 4A, but corresponding to a scenario in which the circuit 100 has a more practical loadline resistance of 0.7 mΩ. This could be modelled in the circuit 100 of FIG. 1 by interposing a 0.7 mΩ resistor between the output terminal 102 and the load 130. As in FIG. 4A, the load current $I_{LOAD}$ spikes from 1 A to 60 A at time t1 which, in this case, causes an ESR-related voltage droop 412b given by $\Delta V_{ESR}$=47.57 mV. After the output voltage $V_{OUT}$ recovers a bit, the output capacitor discharge leads to a voltage slope 414b given having $|\Delta V/\Delta t|$=11.43 mV/μs, as shown.

Figure 5A:
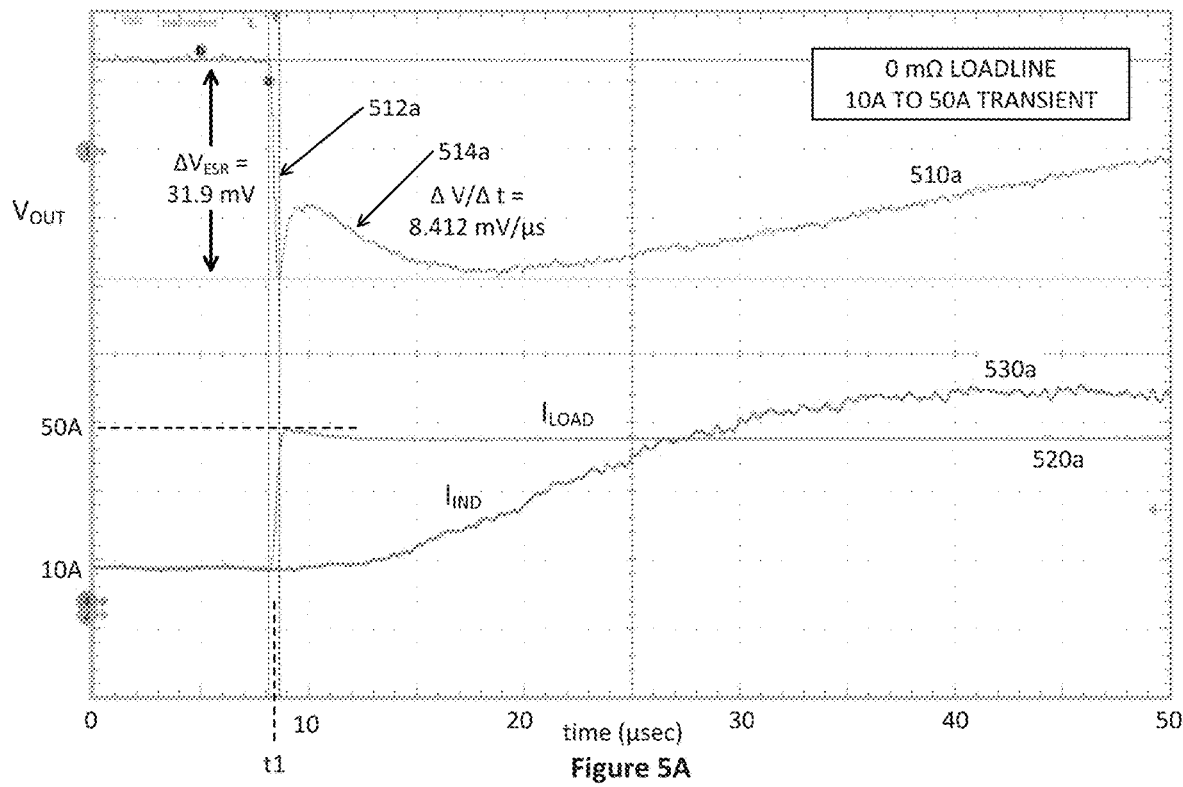
Figure 5B:
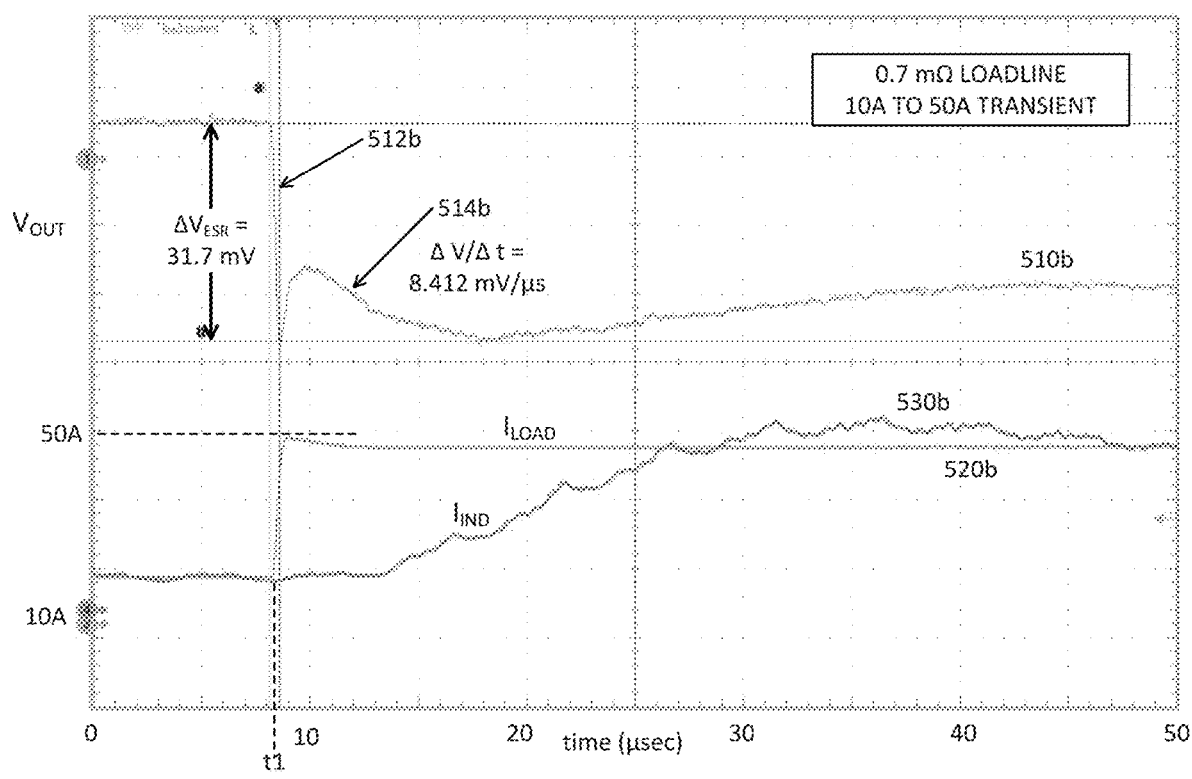

FIGS. 5A and 5B illustrate waveforms 510a, 520a, 530a, 510b, 520b, 530b corresponding to scenarios similar to those of FIGS. 4A and 4B, except that the load current $I_{LOAD}$ transitions from 10 A to 50 A at time t1. For the 0 mΩ loadline scenario of FIG. 5A, this leads to an ESR-related voltage droop 512a given by $\Delta V_{ESR}$=31.9 mV, and the output capacitor discharge leads to a voltage slope 514a given by $|\Delta V/\Delta t|$=8.412 mV/μs. For the 0.7 mΩ loadline scenario of FIG. 5B, this leads to an ESR-related voltage droop 512b given by $\Delta V_{ESR}$=31.7 mV, and the output capacitor discharge leads to a voltage slope 514b given by $|\Delta V/\Delta t|$=8.412 mV/μs.

The output capacitor 120 used in generating the waveforms of FIGS. 4A, 4B, 5A, and 5B had an ESR of 0.81 mΩ and a capacitance $C_{OUT}$=5 mF. Based on these parameters, the peak load current $I_{PEAK}$ just after time t1 was estimated using each of equations (1) and (2) for each of the above-described scenarios, and the results are provided in Table 1.

TABLE 1

Peak Load Current Estimates

| Current Transient | Load line (mΩ) | Initial Regulator Current: $I_{IND}$ (A) | $\Delta V_{ESR}$ (mV) | $\Delta V/\Delta t$ (mV/μs) | $I_{PEAK}$: Eqtn 1 (A) | Error | $I_{PEAK}$: Eqtn 2: (A) | Error |
|---|---|---|---|---|---|---|---|---|
| 1A -> 60A | 0 | 1 | 47.46 | 11.428 | 59.6 | −0.6% | 58.14 | −3% |
|  | 0.7 |  | 48.57 | 11.43 | 61.0 | −1.6% | 58.15 | −3% |
| 10A -> 50A | 0 | 10 | 31.9 | 8.412 | 49.4 | −1.2% | 52.0 | +4% |
|  | 0.7 |  | 31.7 | 8.412 | 49.1 | −1.8% | 52.0 | +4% |

As shown in Table 1, the peak load current estimates are quite accurate using either of equations (1) or (2). While not shown in Table 1, equation (3) could also be used to estimate the peak load current $I_{PEAK}$, and would provide accuracies between those of equations (1) and (2).

Methods for Estimating Peak Load Current

Figure 6:
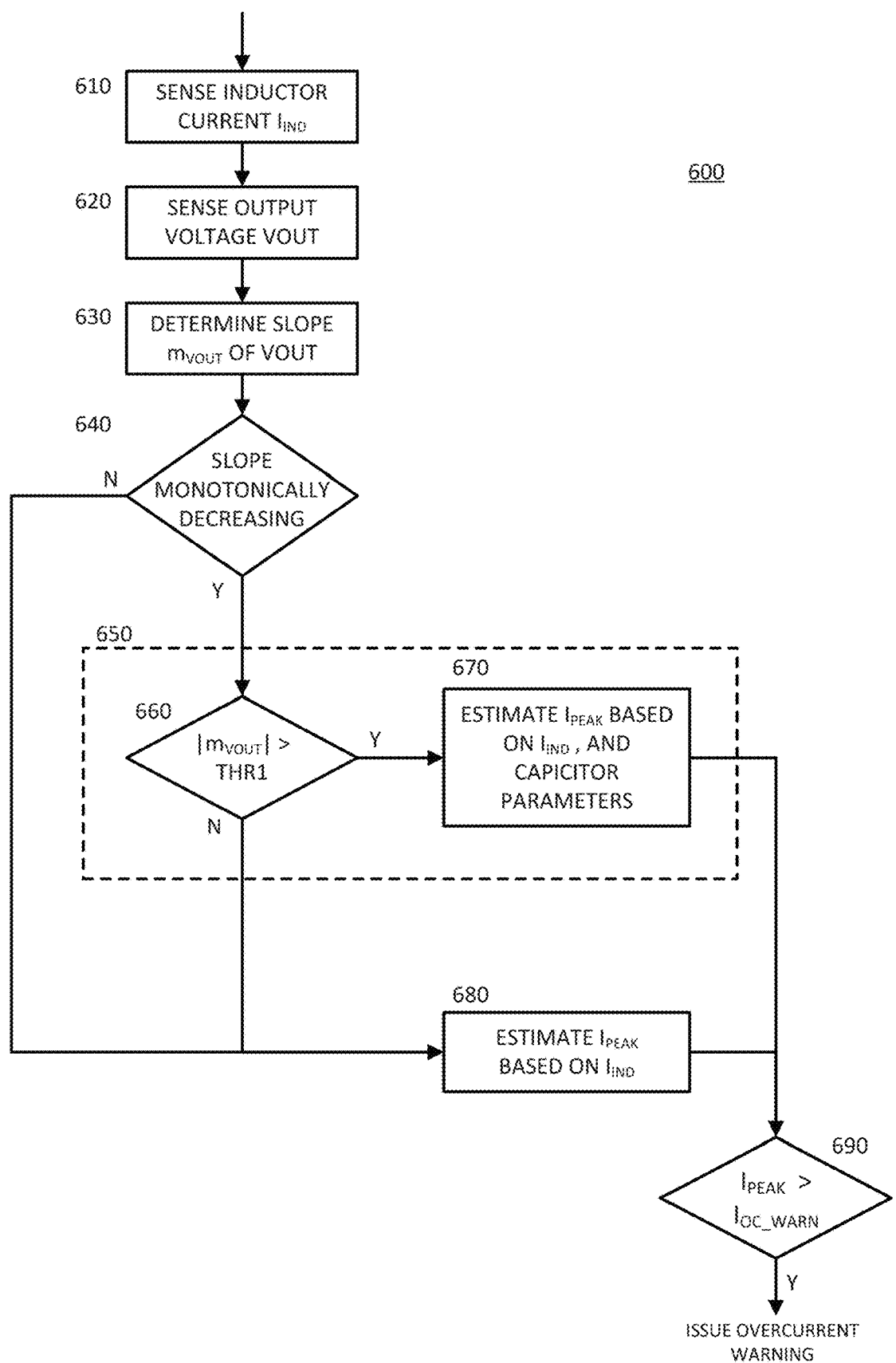
FIG. 6 illustrates a method for estimating a peak load current.

FIG. 6 illustrates an embodiment of a method 600 for estimating a peak load current. FIGS. 7A, 7B, 7C, and 7D illustrate subembodiments that show alternative submethods for such estimation. These methods may be implemented within a controller of a voltage regulator, such as the controller 140 of FIG. 1. The illustrated methods represent examples and it should be understood that the step ordering may be rearranged to achieve the same effect, e.g., steps shown in series may be swapped or performed in parallel, where the context allows this. Furthermore, the illustrated methods do not preclude additional steps.

The method 600 begins by sensing 610 an inductor current $I_{IND}$ of a voltage regulator and sensing 620 an output voltage $V_{OUT}$ of the voltage regulator. A slope $m_{VOUT}$ of the output voltage $V_{OUT}$ is determined 630. If the slope $m_{VOUT}$ is not monotonically decreasing 640, a default technique is used to estimate the peak load current $I_{PEAK}$. As illustrated, the default technique 680 estimates the peak load current $I_{PEAK}$ based on the inductor current $I_{IND}$, e.g., $I_{PEAK}=I_{IND}$. If the slope $m_{VOUT}$ is monotonically decreasing 640, the magnitude of the slope $m_{VOUT}$ is compared 660 against a first threshold THR1. If the magnitude of the slope $m_{VOUT}$ is greater than this first threshold THR1, the peak load current $I_{PEAK}$ is estimated 670 based on the inductor current $I_{IND}$, and one or more parameters of an output capacitor, such as the ESR and/or the output capacitance. As described subsequently in conjunction with FIGS. 7A-7D, this estimation may additionally be based upon the slope $m_{VOUT}$ and/or a voltage droop ΔVOUT. Otherwise, the peak load current $I_{PEAK}$ is estimated using a default technique, such as the estimation 680 based on the inductor current $I_{IND}$. If the resultant estimate of the peak load current $I_{PEAK}$, via any of these techniques, is higher 690 than an OC warning threshold, an OC warning is issued.

It should be appreciated that the order of sensing of the inductor current $I_{IND}$ and the output voltage $V_{OUT}$ may be swapped or that these may be done in parallel. Additionally, the sensing of the inductor current $I_{IND}$ may be performed at any point in the method 600 prior to the estimation 670, 680 of the peak load current $I_{PEAK}$, which uses the inductor current $I_{IND}$.

FIGS. 7A, 7B, 7C, and 7D illustrate alternative submethods 650a, 650b, 650c, 650d, corresponding to the steps of block 650 in FIG. 6. The first submethod 650a illustrates an example in which the ESR-related voltage droop is used to estimate the peak load current $I_{PEAK}$, provided the slope $m_{VOUT}$ has sufficient magnitude. The second sub-method 650b illustrates an example in which the ESR-related voltage droop is detected, but the output capacitance is used to estimate the peak load current $I_{PEAK}$, again providing the slope $m_{VOUT}$ has sufficient magnitude. The third submethod 650c illustrates an example in which the output capacitance is used to estimate the peak load current $I_{PEAK}$, provided the magnitude of the slope $m_{VOUT}$ is within an appropriate range, and does not use the ESR-related voltage droop. The fourth submethod 650d illustrates an example in which estimates are generated using the ESR-related voltage droop and the output capacitance, and these estimates are then combined to estimate the peak load current $I_{PEAK}$.

Figure 7A:
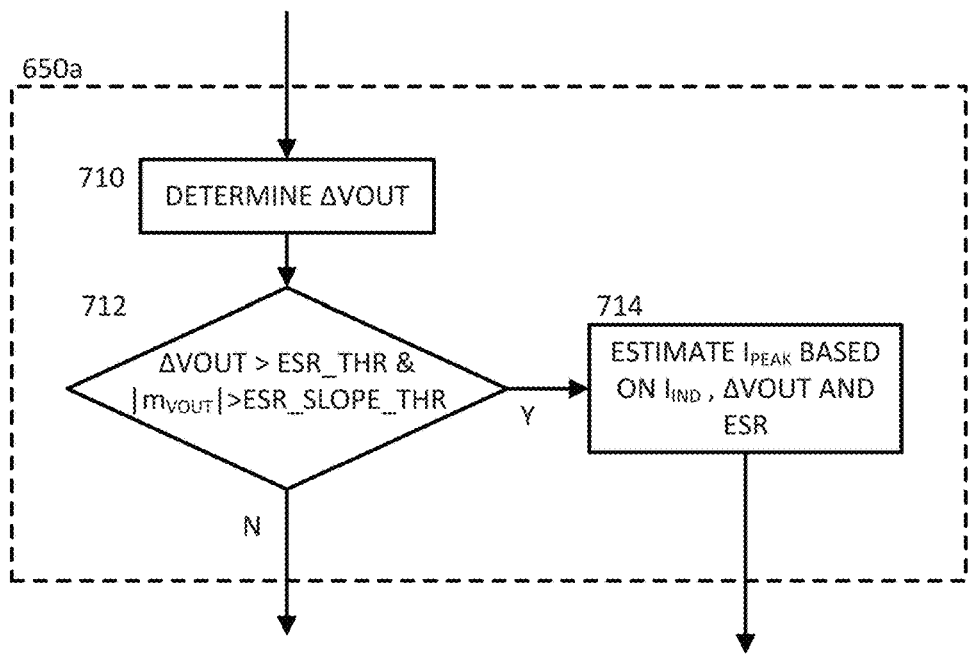
FIGS. 7A, 7B, 7C, and 7D illustrate submethods for estimating a peak load current.

The submethod 650a of FIG. 7A begins by determining 710 a change ΔVOUT in the output voltage of the voltage regulator. If the output voltage change ΔVOUT is greater than an ESR threshold ESR_THR and the magnitude of the slope $m_{VOUT}$ is greater than an ESR slope threshold ESR_SLOPE_THR, the peak load current $I_{PEAK}$ is estimated 714 based on the inductor current $I_{IND}$, the voltage change ΔVOUT and the ESR, e.g., as described in equation (1). As described previously, the ESR-related voltage droop provides a good estimate of the peak load current $I_{PEAK}$ when the output voltage drops at a rapid rate. Furthermore, such a technique provides a peak current estimation very soon after a load transient occurs, i.e., with little latency. If the condition 712 is not met, other techniques, e.g., step 680 in FIG. 6, may be used to estimate the peak load current $I_{PEAK}$ or such estimation may be forgone.

Figure 7B:
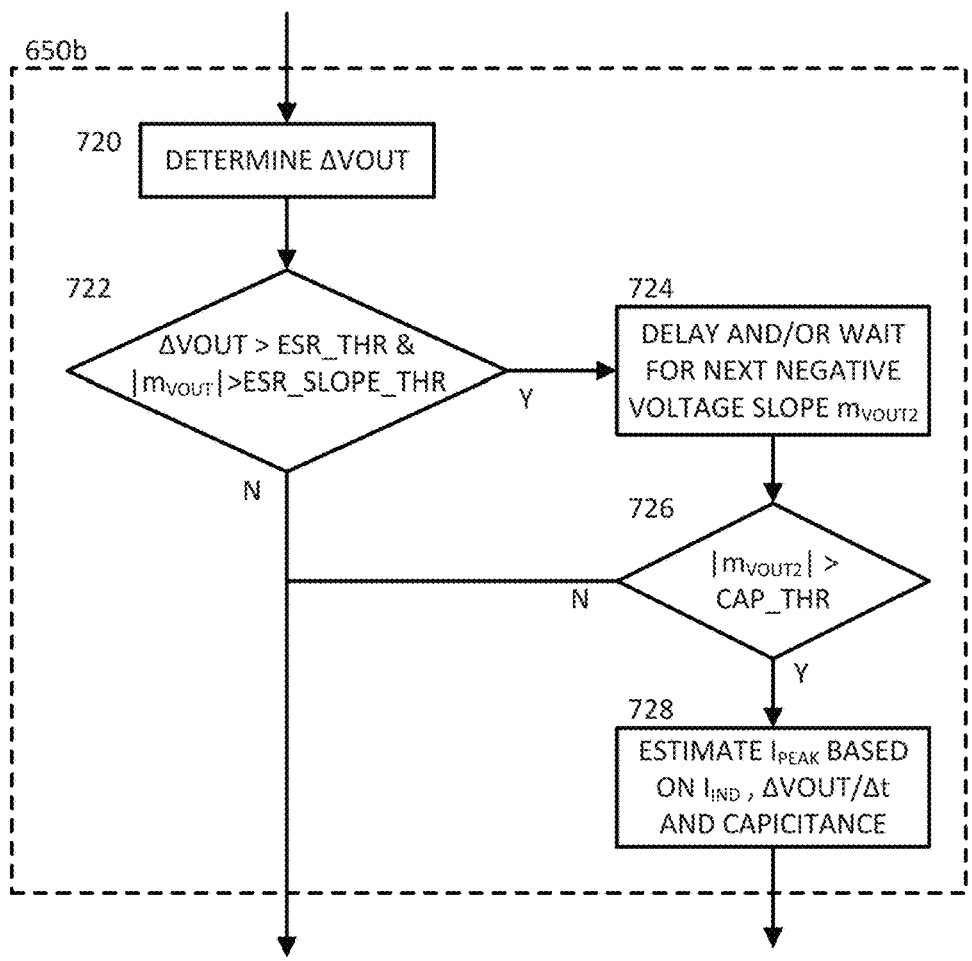

The submethod 650b of FIG. 7B begins by determining 720 a change ΔVOUT in the output voltage. If the output voltage change ΔVOUT is greater than an ESR threshold ESR_THR and the magnitude of the slope $m_{VOUT}$ is greater than an ESR slope threshold ESR_SLOPE_THR, the method proceeds to a step 724 in which a fixed delay is incurred and/or until a next negative slope of the output voltage $V_{OUT}$ is detected. If the magnitude of the newly determined slope $m_{VOUT2}$ exceeds 726 a capacitor-related threshold CAP_THR, the peak load current $I_{PEAK}$ is estimated based on the inductor current $I_{IND}$, the slope $m_{VOUT2}$ (ΔVOUT/Δt), and the output capacitance, e.g., as described above in equation (2). If the output voltage change ΔVOUT is not greater than the ESR threshold ESR_THR or the magnitude of the first slope $m_{VOUT}$ is not greater than an ESR slope threshold ESR_SLOPE_THR or the magnitude of the newly determined slope $m_{VOUT2}$ does not exceed the capacitor-related threshold CAP_THR, other techniques, e.g., step 680 in FIG. 6, may be used to estimate the peak load current $I_{PEAK}$ or such estimation may be forgone.

Figure 7C:
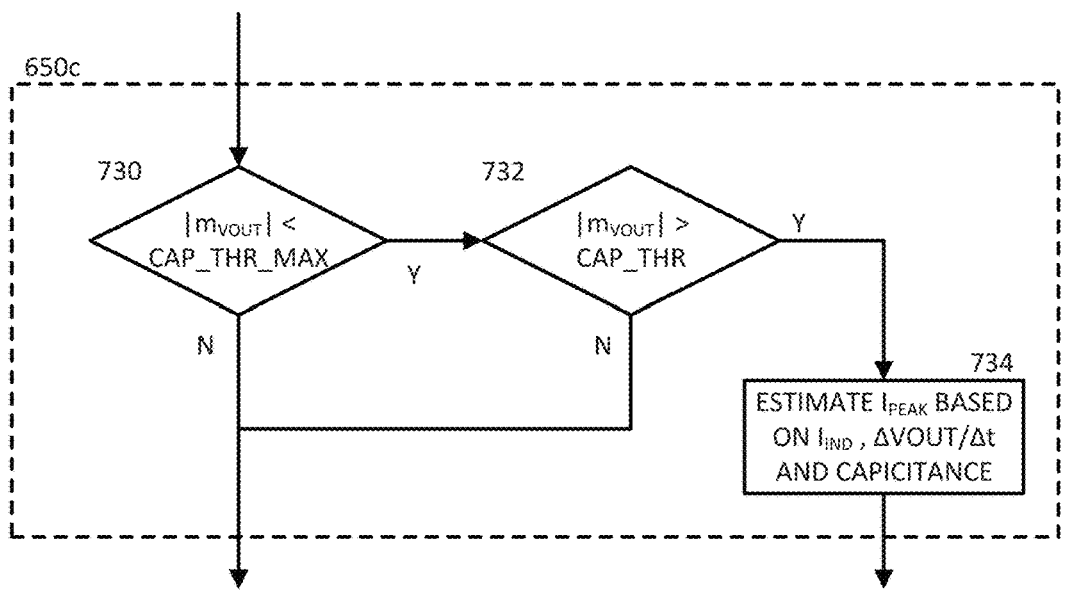

The submethod 650c of FIG. 7C also may use the capacitance of the output capacitor to estimate the peak load current $I_{PEAK}$, but this submethod does not first check for the ESR-related voltage droop. Instead, this submethod monitors the magnitude of the output voltage slope $m_{VOUT}$ and detects 730, 732 if this slope is within a range in which the capacitance discharge may be used to accurately estimate the peak load current $I_{PEAK}$, e.g., using equation (2). As shown, if the magnitude of the slope is between an upper threshold CAP_THR_MAX and a lower threshold CAP_THR, the peak current $I_{PEAK}$ is estimated 734 based on the inductor current $I_{IND}$, the slope $m_{VOUT}$ (ΔVOUT/Δt), and the output capacitance. Otherwise, other techniques, e.g., step 680 in FIG. 6, may be used to estimate the peak load current $I_{PEAK}$ or such estimation may be forgone.

Figure 7D:
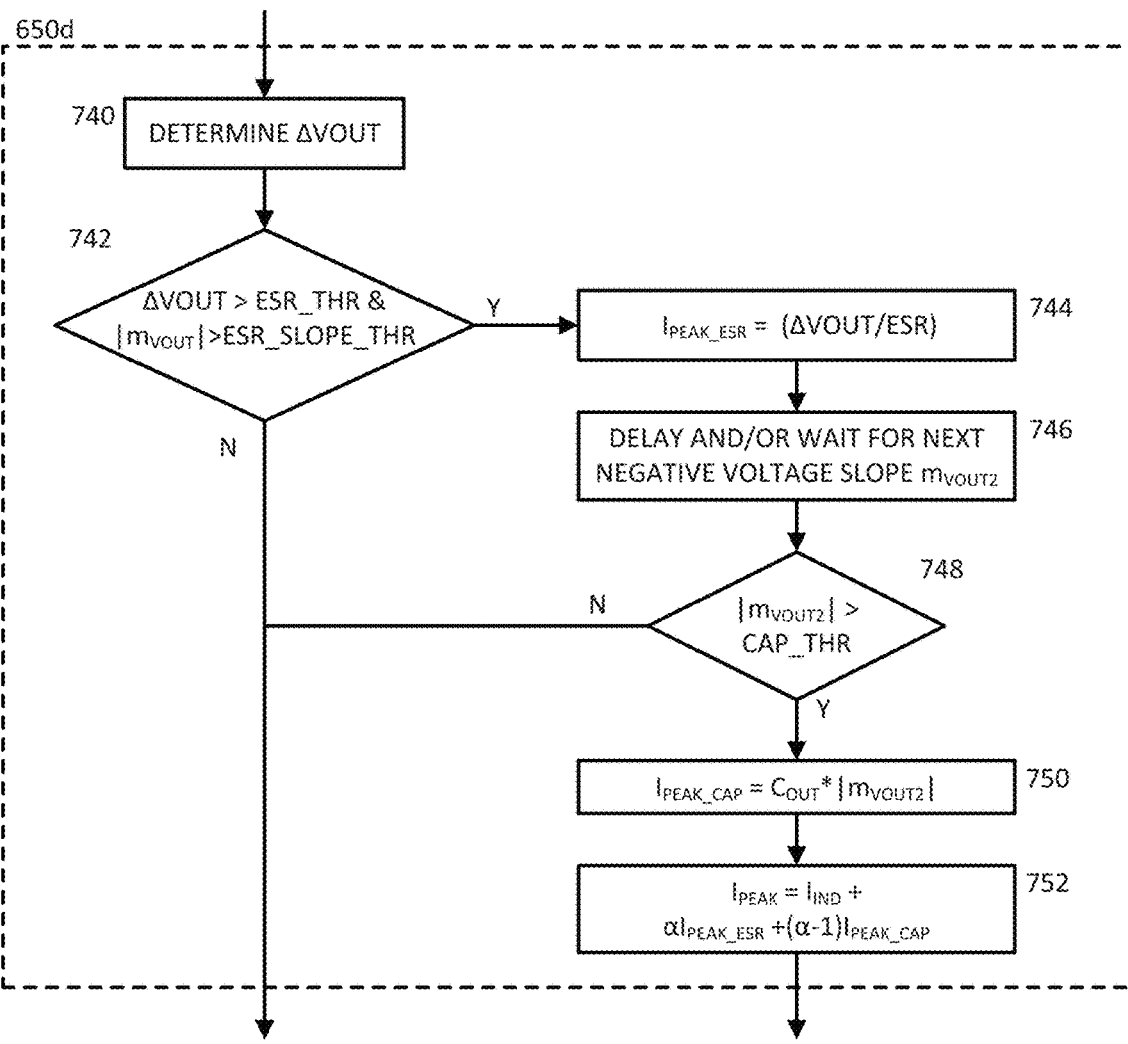

The submethod 650d of FIG. 7D may estimate the peak load current $I_{PEAK}$, using both the ESR-related voltage droop and the output capacitance. The submethod 650d begins in the same manner as submethods 650a and 650b, i.e., by determining 740 an output voltage change ΔVOUT, comparing 742 this voltage change ΔVOUT against an ESR threshold ESR_THR, and comparing 742 the magnitude of the slope $m_{VOUT}$ against an ESR slope threshold ESR_SLOPE_THR. If the voltage change ΔVOUT and the magnitude of the slope $m_{VOUT}$ are sufficiently high, a first load peak estimate $I_{PEAK}$_ESR is estimated 744 based on the voltage droop ΔVOUT and the ESR. The submethod 650d continues by incurring a fixed delay and/or waiting 746 until a second negative slope $m_{VOUT2}$ of the output voltage $V_{OUT}$ is detected. Next, a magnitude of the second negative slope $m_{VOUT2}$ is compared 748 against a capacitor-related threshold CAP_THR. If the second negative slope $m_{VOUT2}$ exceeds this threshold CAP_THR, a second load peak estimate $I_{PEAK}$_CAP is estimated 750 based on the output capacitance $C_{OUT}$ and the second negative slope $m_{VOUT2}$. The peak output load current $I_{PEAK}$ is then estimated 752 using the inductor current $I_{IND}$, and the first and second load peak estimates $I_{PEAK\_ESR}$, $I_{PEAK\_CAP}$. While the illustrated method shows a linear combination of these estimates, other techniques for combining these estimates may be preferred in some applications.

Although the present disclosure is not so limited, the following numbered examples demonstrate one or more aspects of the disclosure.

Example 1

According to an embodiment of a method for estimating a load current provided to a load of a switching voltage regulator, the method may be implemented within the switching voltage regulator. The method comprises sensing an inductor current and an output voltage of the switching voltage regulator. The method further includes determining a voltage change in the sensed output voltage, and estimating a peak current of the load current based upon the inductor current, the voltage change, and a capacitor parameter of an output capacitor of the switching voltage regulator. The capacitor parameter may be, e.g., a capacitance or equivalent series resistance (ESR) of the output capacitor.

Example 2

The method of example 1, wherein sensing the output voltage comprises sensing a first output voltage at a first time instant and sensing a second output voltage at a second time instant that occurs after the first time instant, wherein determining the voltage change comprises taking a difference between the second and first output voltages, and wherein the inductor current is sensed at or before the second time instant.

Example 3

The method of example 1, wherein the capacitor parameter comprises an output capacitor equivalent series resistance (ESR), and wherein estimating the peak current comprises calculating the peak current based upon the inductor current, the voltage change, and the output capacitor ESR.

Example 4

The method of example 3, wherein calculating the peak current comprises dividing the voltage change by the output capacitor ESR and adding a result of the division to the inductor current.

Example 5

The method of example 4, wherein the capacitor parameter also comprises an output capacitance, and the method further comprises estimating a second peak current based upon the inductor current, the voltage change, a time interval over which the voltage change occurs, and the output capacitance.

Example 6

The method of example 1, wherein the capacitor parameter comprises an output capacitance, and wherein estimating the peak current comprises calculating the peak current based upon the inductor current, the voltage change, a time interval over which the voltage change occurs, and the output capacitance.

Example 7

The method of example 6, wherein estimating the peak current comprises dividing the voltage change by the time interval and multiplying a result of the division by the output capacitance.

Example 8

The method of example 1, further comprising comparing the estimated peak current with a current warning threshold, and generating a current warning signal responsive to detecting that the estimated peak current equals or exceeds the current warning threshold.

Example 9

The method of example 1, further comprising retrieving the capacitor parameter from a memory of the switching voltage regulator.

Example 10

According to an embodiment of a switching voltage regulator, the switching voltage regulator is configured to estimate a load current provided to a load. The switching voltage regulator comprises a power stage, an output, an output capacitor, an inductor, and a controller. The output is for coupling to the load and for providing current to the load. The output capacitor is coupled to the output and has capacitor parameters comprising an output capacitance and an output capacitor ESR. The inductor is coupled between the power stage and the output, and has an inductor current flowing through it. The controller is configured to sense the inductor current and an output voltage at the output. The controller is further configured to determine a voltage change in the sensed output voltage, and to estimate a peak current of the load current based upon the sensed inductor current, the voltage change, and at least one of the capacitor parameters.

Example 11

The switching voltage regulator of example 10, wherein the controller is configured to sense a first output voltage at a first time instant, sense a second output voltage at a second time instant that occurs after the first time instant, and determine the voltage change based on a difference between the second and the first output voltages. The controller is further configured to sense the inductor current at or before the second time instant.

Example 12

The switching voltage regulator of example 10, wherein the controller is configured to calculate the estimated peak current based upon the inductor current, the voltage change, and the output capacitor ESR.

Example 13

The switching voltage regulator of example 12, wherein calculating the estimated peak current comprises dividing the voltage change by the output capacitor ESR and adding a result of the division to the inductor current.

Example 14

The switching voltage regulator of example 13, wherein the controller is further configured to estimate a second peak current based upon the inductor current, the voltage change, a time interval over which the voltage change occurs, and the output capacitance.

Example 15

The switching voltage regulator of example 10, wherein the controller is configured to calculate the estimated peak current based upon the inductor current, the voltage change, a time interval over which the voltage change occurs, and the output capacitance.

Example 16

The switching voltage regulator of example 15, wherein calculating the estimated peak current comprises dividing the voltage change by the time interval and multiplying a result of the division by the output capacitance.

Example 17

The switching voltage regulator of example 10, wherein the controller is further configured to compare the estimated peak current with a current warning threshold, and generate a current warning signal responsive to detecting that the estimated peak current equals or exceeds the current warning threshold.

Example 18

The switching voltage regulator of example 10, further comprising a memory wherein at least one of the capacitor parameters is stored, and wherein the controller is configured to retrieve at least one of the capacitor parameters from the memory prior to estimating the peak current.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method, within a switching voltage regulator, for estimating a load current provided to a load of the switching voltage regulator, the method comprising:
    sensing an inductor current of the switching voltage regulator;
    sensing an output voltage of the switching voltage regulator;
    determining a voltage change in the sensed output voltage;
    estimating a peak current of the load current based upon the inductor current, the voltage change, and a capacitor parameter of an output capacitor of the switching voltage regulator,
    wherein the capacitor parameter comprises an output capacitor equivalent series resistance (ESR);
    wherein estimating the peak current comprises calculating the peak current based upon the inductor current, the voltage change, and the output capacitor ESR, wherein calculating the peak current comprises dividing the voltage change by the output capacitor ESR and adding a result of the division to the inductor current.

2. The method of claim 1,
wherein sensing the output voltage comprises sensing a first output voltage at a first time instant, and sensing a second output voltage at a second time instant that occurs after the first time instant;
wherein determining the voltage change comprises taking a difference between the second and first output voltages; and
wherein the inductor current is sensed at or before the second time instant.

3. The method of claim 1, wherein the capacitor parameter also comprises an output capacitance, the method further comprising:
estimating a second peak current based upon the inductor current, the voltage change, a time interval over which the voltage change occurs, and the output capacitance.

4. The method of claim 1, further comprising:
comparing the estimated peak current with a current warning threshold; and
generating a current warning signal responsive to detecting that the estimated peak current equals or exceeds the current warning threshold.

5. The method of claim 1, further comprising:
retrieving the capacitor parameter from a memory of the switching voltage regulator.

6. A switching voltage regulator configured to estimate a load current provided to a load of the switching voltage regulator, the switching voltage regulator comprising:
a power stage;
an output for coupling to the load and for providing the load current;
an output capacitor coupled to the output and having capacitor parameters comprising an output capacitance and an output capacitor equivalent series resistance (ESR);
an inductor coupled between the power stage and the output, and having an inductor current; and
a controller configured to:
sense the inductor current;
sense an output voltage at the output;
determine a voltage change in the sensed output voltage;
estimate a peak current of the load current based upon the sensed inductor current, the voltage change, and at least one of the capacitor parameters;
calculate the estimated peak current based upon the inductor current, the voltage change, and the output capacitor ESR,
wherein the controller is configured to calculate the estimated peak current by dividing the voltage change by the output capacitor ESR and adding a result of the division to the inductor current.

7. The switching voltage regulator of claim 6, wherein the controller is configured to:
sense a first output voltage at a first time instant, sense a second output voltage at a second time instant that occurs after the first time instant, and determine the voltage change based on a difference between the second and the first output voltages; and
sense the inductor current at or before the second time instant.

8. The switching voltage regulator of claim 6, wherein the controller is further configured to:
estimate a second peak current based upon the inductor current, the voltage change, a time interval over which the voltage change occurs, and the output capacitance.

9. The switching voltage regulator of claim 6, wherein the controller is further configured to:
compare the estimated peak current with a current warning threshold; and
generate a current warning signal responsive to detecting that the estimated peak current equals or exceeds the current warning threshold.

10. The switching voltage regulator of claim 6, further comprising:
a memory wherein at least one of the capacitor parameters is stored,
wherein the controller is configured to retrieve at least one of the capacitor parameters from the memory prior to estimating the peak current.

11. A method, within a switching voltage regulator, for estimating a load current provided to a load of the switching voltage regulator, the method comprising:
sensing an inductor current of the switching voltage regulator;
sensing an output voltage of the switching voltage regulator;
determining a voltage change in the sensed output voltage;
estimating a peak current of the load current based upon the inductor current, the voltage change, and a capacitor parameter of an output capacitor of the switching voltage regulator,
wherein the capacitor parameter comprises an output capacitance;
wherein estimating the peak current comprises calculating the peak current based upon the inductor current, the voltage change, a time interval over which the voltage change occurs, and the output capacitance,
wherein estimating the peak current comprises dividing the voltage change by the time interval and multiplying a result of the division by the output capacitance.

12. A switching voltage regulator configured to estimate a load current provided to a load of the switching voltage regulator, the switching voltage regulator comprising:
a power stage;
an output for coupling to the load and for providing the load current;
an output capacitor coupled to the output and having capacitor parameters comprising an output capacitance and an output capacitor equivalent series resistance (ESR);
an inductor coupled between the power stage and the output, and having an inductor current; and
a controller configured to:
sense the inductor current;
sense an output voltage at the output;
determine a voltage change in the sensed output voltage;
estimate a peak current of the load current based upon the sensed inductor current, the voltage change, and at least one of the capacitor parameters;
calculate the estimated peak current based upon the inductor current, the voltage change, a time interval over which the voltage change occurs, and the output capacitance,
wherein the controller is configured to calculate the estimated peak current by dividing the voltage change by the time interval and multiplying a result of the division by the output capacitance.

* * * * *